United States Patent [19]

Holzapfel

[11] 3,903,415
[45] Sept. 2, 1975

[54] X-RAY DIFFRACTION MEASUREMENT DEVICE USING WHITE X-RAYS
[75] Inventor: Wilfried Bernd Holzapfel, Gerlingen, Germany
[73] Assignee: Max-Planck-Gesellschaft zur Foerderung der Wissenschaften e.V., Goettingen, Germany
[22] Filed: Mar. 12, 1974
[21] Appl. No.: 450,374

[30] Foreign Application Priority Data
Mar. 13, 1973 Germany............................ 2312507

[52] U.S. Cl................................. 250/272; 250/274
[51] Int. Cl. ........................................... G01n 23/20
[58] Field of Search ........... 250/272, 273, 274, 275, 250/276, 277

[56] References Cited
UNITED STATES PATENTS
2,794,127  5/1957  Friedman............................ 250/273
2,805,342  9/1957  Lang.................................. 250/277

FOREIGN PATENTS OR APPLICATIONS
732,519  3/1943  Germany ............................ 250/272

Primary Examiner—James W. Lawrence
Assistant Examiner—C. E. Church
Attorney, Agent, or Firm—William R. Woodward

[57] ABSTRACT

A diaphragm with an annular slot is placed between a powder sample and a detector, which may be a disc or annulus, while the sample is irradiated with white X-rays directed towards the center of the diaphragm. The distance of the diaphragm behind the sample and the radius of the annular slot determine the diffraction angle of the rays that will be detected. A semiconductor detector with high energy resolution produces an output signal that depends upon the wavelength of the detector radiation. A thick block with a conical slot may be used instead of a thin diaphragm.

8 Claims, 2 Drawing Figures

X-RAY DIFFRACTION MEASUREMENT DEVICE USING WHITE X-RAYS

Classical X-ray diffraction measurements in accordance with Laue and Debye-Scherrer are carried out with monochromatic X-ray radiation and the diffracted X-ray diffraction is photographically registered.

Some years ago methods of investigation were proposed which operate with "energy-dispersive X-ray radiation." In accordance with these methods a beam of white X-ray radiation is caused to pass through the sample and the energy (and therefore the wave length) of the X-ray radiation is measured, which is diffracted by the sample at a pre-established angle to the axis of primary beam, using a semiconductor detector with a high energy resolution. Such detectors have been available for some time.

The word "white" as applied to X-ray radiation is understood to mean X-ray radiation which is continuous in respect to wave length (Bremsstrahlung). A semiconductor detector with a high energy resolution is a semiconductor element, which can consist for example of a lithium-doped germanium or silicon crystal or a semiconductor component with a surface barrier layer and like a proportional counting tube supplies an electrical output signal, whose amplitude depends on the energy $h\nu$ of the incident X-ray radiation. Semiconductor detectors of this type are generally operated at low temperatures, for example at the temperature of liquid nitrogen, and the electrical signals produced are evaluated by a multi channel pulse height analyser.

A particular advantage of the investigation method operating with energy dispersive X-ray diffraction resides in that during the measurement no mechanical parts of the apparatus have to be moved, something which in many cases, for example in the case of X-ray diffraction investigations of solids under high pressure is very much to be desired. On the other hand, apparatus available in the prior art for such investigations have the disadvantages, inter alia, that relatively long measurement times are necessary and that in the case of Debye-Scherrer investigations measurement errors can occur, if the sample is not present as a very homogeneous and fine ("ideal") powder. The dependency occurring in the case of a non-ideal powder, of the relative intensities of different X-ray reflections from the chance orientation of the sample can admittedly be overcome by turning the sample during the measuring operation, in this case, however, one of the principal advantages of the method is lost, that is to say that no mechanical parts need to be moved.

One aim of the present invention is to avoid the above-mentioned disadvantages, that is to say to create a device for measurements with energy dispersive X-ray diffraction, which guarantees short times of measurement and even in the case of the use of non-ideal powders provides exact results.

In accordance with the invention this aim is achieved by a device for X-ray diffraction measurements using white X-ray radiation, which comprises a sample holder arranged in a primary ray path, and a semiconductor detector, arranged at a distance from the axis of the primary ray path, for the production of an electrical output signal, which depends on the wave length of the X-ray radiation which is diffracted by a sample arranged in the sample holder towards the semiconductor detector and is characterised in that between the sample holder and the semiconductor detector there is arranged a diaphragm or screen, which is substantially non-transparent for the X-ray radiation, and has an aperture in the form of at least one sector of an annular ring concentric to the axis of the primary ray path and in that the semiconductor detector is so dimensioned and arranged that it catches substantially the whole diffracted or dispersed X-ray radiation, which passes through the opening of the diaphragm or screen.

As compared with previously known devices the spatial angle zone covered by the semiconductor detector is enlarged, while keeping to the same angle resolution, many times, for example of a factor of 100 and more and even without turning of the sample during measurement the intensities in the azimuthal angular range covered by the aperture of the diaphragm are communicated.

In some cases the primary radiation may produce secondary radiation owing to diffraction and dispersion and in such cases it is desirable to substitute a relatively thick block for the diaphragm with a conical slot providing the opening for selecting the secondary radiation, which comes from a relatively small volume of the sample, and eliminating secondary radiation from the sample holder and from other portions of the sample.

The invention will be described in detail by way of example with reference to the drawing, in which.

Figure 1:
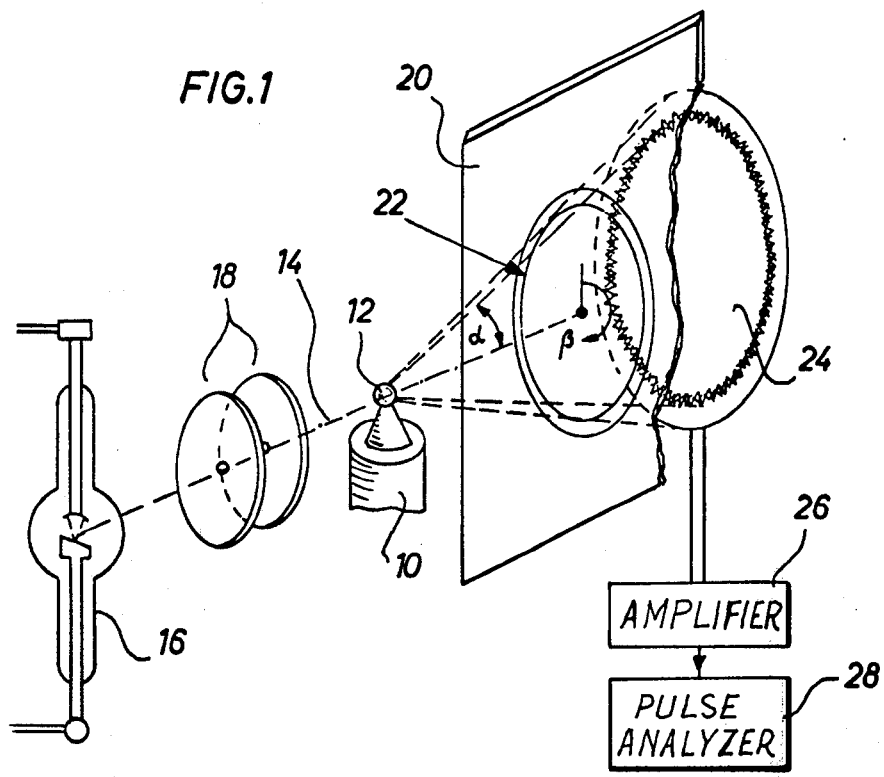
FIG. 1 shows a simplified representation of a first embodiment of the invention which is more particularly suitable for the investigation of practically punctuate samples.

The device shown diagrammatically and in perspective in FIG. 1 comprises a sample holder 10 for a small spherical sample 12 of pressed, fine powder of the material to be investigated. The sample 12 is held by means of the sample holder 10 in the ray path of a white primary X-ray or beam 14, which is produced by an X-ray tube 16 associated with two pinhole diaphragms 18. The X-ray tube 16 preferably has a point focus and supplies a "white" X-ray radiation, that is to say X-ray radiation in a continuous wave length range or spectrum. As seen from the X-ray tube 16 behind the sample holder a diaphragm 20 is arranged, which in the case of the present embodiment consists of a lead plate 20 arranged perpendicular to the axis of the primary X-ray beam 14, and the lead plate 20 has a circular opening 22, whose center point coincides with the axis of the primary X-ray beam or ray and through which the X-ray radiation which is diffracted by the sample at a predetermined angle $\alpha$ with respect to the axis of the primary X-ray beam 14 to a semiconductor detector 24 arranged behind the diaphragm 20.

The semiconductor detector 24 is a conventional device with a high energy resolution and has the form of a circular disc whose diameter is so large that it catches the whole of the diffracted X-ray radiation which passes through the opening 22, and is indicated by the annular zone denoted with criss-cross shading.

The semiconductor detector 24 is connected in a conventional manner with an amplifier 26 and a multi channel pulse analyser 28.

Since in the case of the device in accordance with FIG. 1 the diffracted X-ray radiation is detected in the full range of 360° of the azimuth angle β, as compared with prior art devices it is possible to operate with a substantially shorter period of measurement and/or it is possible to use a finer primary beam. Furthermore, a lack of symmetry, which are due to the use of a sample 12 which is not completely homogeneous, are averaged out and thus made practically meaningless.

Figure 2:
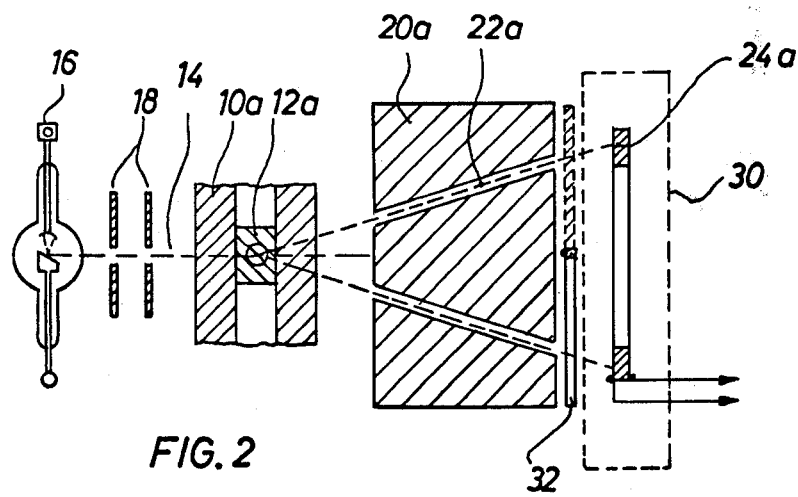
FIG. 2 is a diagrammatic representation of a second embodiment of the invention which is particularly suitable for the investigation of larger samples or of samples which are adjacent to diffracting or dispersing foreign bodies.

FIG. 2 shows a second embodiment of the invention in a simplified form and in axial section. The sample holder 10a consists in this case of a high pressure tube, in which the sample 12a can be placed during investigation under high pressure. Since the primary ray or beam bundle 14 during its whole passage through the sample holder 10a and the relatively large or extended sample 12a can produce secondary radiation owing to diffraction and dispersion, in this case the diaphragm does not consist of a thin plate as was the case with the embodiment in accordance with FIG. 1, and instead consists of a block, which is relatively thick in comparison with the breadth of the opening measured in the radial direction, of lead or the like and the opening 22a is formed by a generally conical envelope-shaped passage or opening. Owing to this construction of the diaphragm the aperture or opening 22a only allows the passage of that secondary radiation, which comes from a relatively small volume of the sample 12a, this volume being denoted by a small circle and surrounding the tip or point of the annular conical envelope surface passing through the aperture 22a. Radiation, which comes from the parts of the sample or from the sample holder before and following this volume is not allowed to pass.

The semiconductor detector 24a has in this case the shape of an annular ring, which is just so large and so broad that it can catch the X-ray radiation completely which is diffracted and allowed passage by the aperture 22a. This offers the advantage over a circular disc-shaped detector 24 (FIG. 1) that the capacity is smaller and therefore the resolution is larger.

The semiconductor detector 24a is arranged in a cryostat 30 only indicated diagrammatically.

In the case of the investigation of monocrystals Laue diagrams can be produced with the help of a radially slitted disc-shaped diaphragm 32, which is arranged in front of the semiconductor detector 24a in the ray path of the diffracted X-ray radiation and which can be turned by a device, not shown, about the axis of the primary ray bundle. In the case of measurement the pulses produced by the semiconductor detector 24a are stored as a function of the energy of the incident X-ray radiation and the azimuth angle position of the slot-shaped radial opening or aperture of the rotary diaphragm 32 in a two-parameter multi channel analyser.

An additional parameter can be obtained if as a sample a monocrystal is employed and the crystal is turned in a defined manner during the measurement.

Instead of the diaphragms shown with an opening 22 or 22a, respectively, which is annular in cross-section it is also possible to use diaphragms, whose opening only forms an annular sector.

The device can also be used for measurements with backward dispersion and with glancing incidence of the X-ray radiation.

The function of the diaphragm 32 can also be fulfilled by an X-ray detector used in its place and adapted to carry out local resolution, more particularly in the form of a semiconductor detector, which makes it possible to determine the azimuth angle of the registered X-ray radiation.

At present, Si(Li) detectors are preferably used as semiconductor detector.

I claim:
1. A device for X-ray diffraction measurements using white X-ray radiation, comprising:
   a source of white X-ray radiation;
   a sample holder arranged in a primary ray path of said source;
   a semiconductor X-ray detector means having substantial resolution with respect to the energy of detected X-rays arranged at a distance from the axis of the primary ray path, for the production of an electrical output signal representative of the wave length distribution of the X-ray radiation which is diffracted by a sample arranged in the sample holder towards the semiconductor detector means, and
   a diaphragm (20, 20a), which is substantially non-transparent for the X-ray radiation located between the sample holder (10, 10a) and the semiconductor detector means (24, 24a) and having an aperture (22, 22a) in the form of at least a sector of an annular slot concentric to the axis of the primary ray path,
   said semiconductor detector means (24, 24a) being so dimensioned and arranged that it catches substantially the whole diffracted or dispersed X-ray radiation which passes through the opening of the diaphragm.

2. A device in accordance with claim 1, in which the opening or aperture (22, 22a) as looked at in a plane perpendicular to the primary radiation path has the form of a complete annular ring.

3. A device in accordance with claim 2, in which the semiconductor detector (24) has the form of an annular disc and is arranged concentrically in relation to the axis of the primary ray or beam path.

4. A device in accordance with claim 1, in which the semiconductor detector (24a) has the form of a circular ring and is arranged concentrically to the axis of the primary ray or beam path.

5. A device in accordance with claim 1, in which the diaphragm (20) consists of an apertured plate, whose thickness is smaller than the radial breadth of the opening or aperture (22).

6. A device in accordance with claim 1, in which the diaphragm (20a) consists of a block, whose thickness amounts to at least a multiple of the radial dimension of the opening or aperture (22a) and in which the opening (22a) consists of a passage which has the form of a truncated hollow cone, of which the tip lies in the part of the sample holder (10a) intended for receiving the sample (12a).

7. A device in accordance with claim 1, in which between the sample holder and the semiconductor detector there is also arranged a second diaphragm (32), which is substantially non-transparent for the X-ray radiation, with an opening which is arranged in the path of the X-ray radiation passing through the opening (20, 22a) of the first-mentioned diaphragm, which opening extends only over a limited azimuth angle range about the axis provided by the primary ray path.

8. A device in accordance with claim 1, in which on the side of the diaphragm (20, 20a), remote from the sample holder (10, 10a), a locally resolving X-ray detector is arranged.

* * * * *